US008739581B2

(12) United States Patent
Shiga et al.

(10) Patent No.: US 8,739,581 B2
(45) Date of Patent: Jun. 3, 2014

(54) WASHING MACHINE (75) Inventors: Tsuyoshi Shiga, Tokyo (JP); Isamu Nitta, Tokyo (JP)

(73) Assignees: Kabushiki Kaisha Toshiba, Tokyo (JP); Toshiba Consumer Electronics Holdings Corporation, Tokyo (JP); Toshiba Home Appliances, Tokyo (JP)

( * ) Notice: Subject to any disclaimer, the term of this patent is extended or adjusted under 35 U.S.C. 154(b) by 931 days.

(21) Appl. No.: 12/741,524

(22) PCT Filed: Nov. 4, 2008

(86) PCT No.: PCT/JP2008/003163
§ 371 (c)(1),
(2), (4) Date: Aug. 25, 2010

(87) PCT Pub. No.: WO2009/060587
PCT Pub. Date: May 14, 2009

(65) Prior Publication Data
US 2010/0307201 A1 Dec. 9, 2010

(30) Foreign Application Priority Data
Nov. 5, 2007 (JP) .................................. 2007-287441

(51) Int. Cl.
*D06F 37/00* (2006.01)
*D06F 37/30* (2006.01)
*D06F 37/36* (2006.01)
*H02K 21/00* (2006.01)

(52) U.S. Cl.
CPC .............. *D06F 37/30* (2013.01); *D06F 37/304* (2013.01); *D06F 37/306* (2013.01); *D06F 37/36* (2013.01)
USPC .......... 68/140; 310/46; 310/152; 310/156.01; 310/156.07

(58) Field of Classification Search
USPC ........................................................... 68/140
See application file for complete search history.

(56) References Cited

U.S. PATENT DOCUMENTS

| 4,195,500 A | 4/1980 | Tobita |
| 5,773,908 A | 6/1998 | Stephens |

(Continued)

FOREIGN PATENT DOCUMENTS

| JP | 63-220749 | 9/1988 |
| JP | 06-102054 | 4/1994 |

(Continued)

OTHER PUBLICATIONS

Korean Office Action issued in KR 2007-289886 on Oct. 30, 2012.

(Continued)

*Primary Examiner* — Michael Barr
*Assistant Examiner* — Levon J Shahinian
(74) *Attorney, Agent, or Firm* — DLA Piper LLP (US)

(57) ABSTRACT

A washing machine includes a water tub, an electric motor, and a control device. The motor comprises a stator including a stator coil, a rotor magnet arranged circumferentially with respect to the rotor, and a control device. The rotor magnet includes a permanent magnet. When the control device applies a first voltage to the stator coil in a wash step of the washing operation, the rotor magnet is magnetized so that a magnetic flux of the rotor magnet acting on the stator is increased without reversal of a direction of magnetization. When the control device applies a second voltage to the stator soil in a dehydration step of the washing operation, the rotor magnet is magnetized so that a magnetic flux of the rotor magnet acting on the stator is reduced without reversal of a direction of magnetization as compared with the magnetic flux in the wash step.

10 Claims, 9 Drawing Sheets

(56) References Cited

U.S. PATENT DOCUMENTS

| | | | |
|---|---|---|---|
| 5,778,703 | A | 7/1998 | Imai |
| 5,913,952 | A | 6/1999 | Kim |
| 6,041,625 | A | 3/2000 | Nagai |
| 6,060,851 | A | 5/2000 | Imai |
| 6,257,027 | B1 | 7/2001 | Imai |
| RE37,576 | E | 3/2002 | Stephens |
| 6,369,538 | B1 | 4/2002 | Youn |
| 6,445,879 | B1 | 9/2002 | Youn |
| 6,737,828 | B2 | 5/2004 | Kiuchi |
| 6,748,618 | B1 | 6/2004 | Darby |
| 7,017,377 | B2 | 3/2006 | Hosoito |
| 7,579,798 | B2 | 8/2009 | Hosoito |
| 7,692,349 | B2 | 4/2010 | Ahn |
| 7,812,557 | B2 | 10/2010 | Maekawa |
| 7,923,879 | B2 | 4/2011 | Nitta |
| 8,129,931 | B2 | 3/2012 | Maekawa |
| 8,134,267 | B2 | 3/2012 | Kim |
| 2002/0189301 | A1 | 12/2002 | Hosoito |
| 2003/0020431 | A1 | 1/2003 | Kiuchi |
| 2005/0160771 | A1 | 7/2005 | Hosoito |
| 2006/0042328 | A1 | 3/2006 | Komatsu |
| 2006/0053838 | A1 | 3/2006 | Inuzuka |
| 2006/0053839 | A1 | 3/2006 | Matsushima |
| 2006/0091754 | A1 | 5/2006 | Kim |
| 2006/0156766 | A1 | 7/2006 | Ioku |
| 2006/0177204 | A1 | 8/2006 | Zeh |
| 2007/0107474 | A1 | 5/2007 | Jun |
| 2007/0113598 | A1 | 5/2007 | Jun |
| 2007/0125135 | A1* | 6/2007 | Kim et al. ............ 68/140 |
| 2007/0216250 | A1 | 9/2007 | Ahn |
| 2008/0297099 | A1 | 12/2008 | Maekawa |
| 2009/0056385 | A1 | 3/2009 | Maekawa |
| 2009/0115361 | A1 | 5/2009 | Nitta |
| 2009/0224622 | A1 | 9/2009 | Kim |
| 2009/0267546 | A1 | 10/2009 | Maekawa |

FOREIGN PATENT DOCUMENTS

| | | |
|---|---|---|
| JP | 06-312085 | 11/1994 |
| JP | H07-336980 | 12/1995 |
| JP | H10-155262 | 6/1998 |
| JP | 2001-146369 | 5/2001 |
| JP | 2003-181187 | 2/2003 |
| JP | 2003-284296 | 10/2003 |
| JP | 2003-333887 | 11/2003 |
| JP | 2004-23839 | 1/2004 |
| JP | 2005-304204 | 10/2005 |
| JP | 2005-334346 | 12/2005 |
| JP | 2006-280195 | 10/2006 |

OTHER PUBLICATIONS

English Language Translation of Korean Office Action issued in KR 2007-289886 on Oct. 30, 2012.
English Lanbuage Abstract of JP 2004-023839, published Jan. 22, 2004.
Machine English Language Translation of JP 2004-023839, published Jan. 22, 2004.
English Language Abstract of JP 06-312085, published Nov. 8, 1994.
Machine English Language Translation of JP 06-312085, published Nov. 8, 1994.
English Language Abstract of JP 06-102054, published Apr. 12, 1994.
Machine English Language Translation of JP 06-102054, published Apr. 12, 1994.
English Language Abstract of JP 63-220749, published Sep. 14, 1988.
Search Report issued in International Application No. PCT/JP2008/003163 dated Jan. 13, 2009.
Japanese Office Action issued in JP 2007-289886 on Jun. 26, 2012.
English Language Translation of Japanese Office Action issued in JP 2007-289886 on Jun. 26, 2012.
Taiwanese office Action issued in TW 097142864 on Feb. 18, 2013.
English Language Translation of Taiwanese office Action issued in TW 097142864 on Feb. 18, 2013.
Korea Office Action issued in KR 10-2012-7016275 on Feb. 25, 2013.
English Language Translation of Korea Office Action issued in KR 10-2012-7016275 on Feb. 25, 2013.
Japanese Office Action issued in JP 2007-289886 on Oct. 30, 2012.
English Language Translation of Japanese Office Action issued in JP 2007-289886 on Oct. 30, 2012.
Search Report issued in PCT/JP2008/003164, dated Feb. 3, 2009.
English Translation of Search Report issued in PCT/JP2008/003164, dated Feb. 3, 2009.
English Language Abstract of JP H10-155262, published Jun. 9, 1998.
Machine English Language Translation of JP H10-155262, published Jun. 9, 1998.
English Language Abstract of JP 2006-280195, published Oct. 12, 2006.
Machine English Language Translation of JP 2006-280195, published Oct. 12, 2006.
English Language Abstract of JP H07-336980, published Dec. 22, 1995.
Machine English Language Translation of JP H07-336980, published Dec. 22, 1995.
English Language Abstract of JP 2003-181187, published Feb. 7, 2003.
Machine English Language Translation of JP 2003-181187, published Feb. 7, 2003.
English Language Abstract of JP 2001-146369, published May 29, 2001.
Machine English Language Translation of JP 2001-146369, published May 29, 2001.
English Language Abstract of JP 2003-333887, published Nov. 21, 2003.
Machine English Language Translation of JP 2003-333887, published Nov. 21, 2003.
English Language Abstract of JP 2005-334346, published Dec. 8, 2005.
Machine English Language Translation of JP 2005-334346, published Dec. 8, 2005.
English Language Abstract of JP 2003-284296, published Oct. 3, 2003.
Machine English Language Translation of JP 2003-284296, published Oct. 3, 2003.
English Language Abstract of JP 2005-304204, published Oct. 27, 2005.
Machine English Language Translation of JP 2005-304204, published Oct. 27, 2005.
File History of U.S. Appl. No. 12/741,768.
Korean Office Action issued in KR 10-2010-7012072 on Sep. 6, 2011.
English Translation of Korean Office Action issued in KR 10-2010-7012072 on Sep. 6, 2011.
U.S. Appl. No. 12/741,768.

* cited by examiner

WASHING MACHINE

TECHNICAL FIELD

Embodiments described herein relate to a washing machine provided with an electric motor which rotates a load such as a rotating tub.

BACKGROUND ART

For example, a drum washing machine is provided with an electric motor which rotates a drum serving as a rotating tub rotatably mounted in a water tub. In the washing machine, the drum is rotated at low speeds in a positive direction or a reverse direction in each of wash and rinse steps, and the rotating tub is rotated at high speeds in one direction in an intermediate or final dehydration step. The drum is thus rotated at high speeds so that centrifugal dehydration is carried out.

Figure 9:
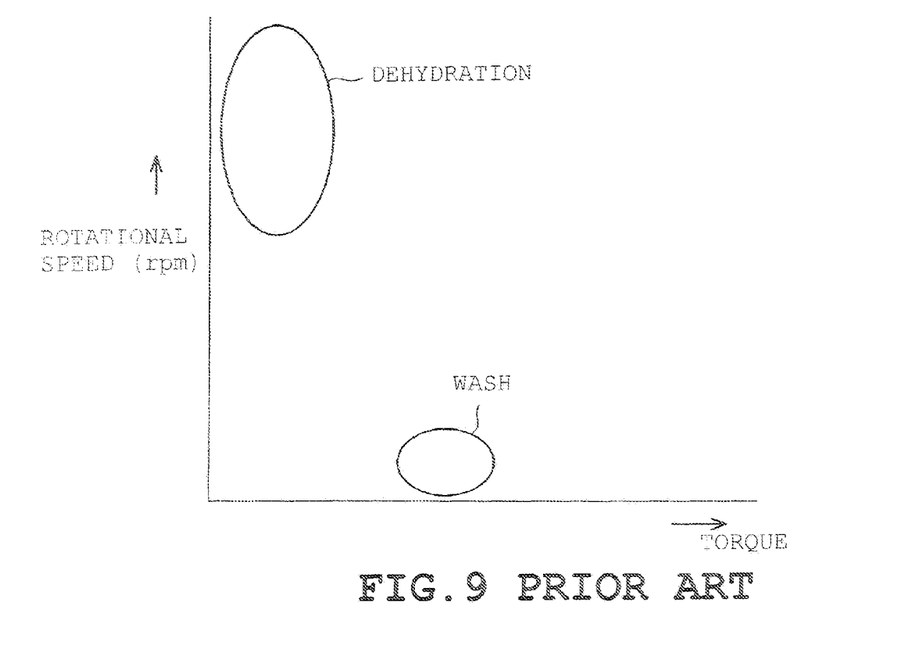
FIG. 9 is a graph showing the relationship between torque and rotational speed in each of wash and dehydration needed for a washing machine motor.
Figure 10:
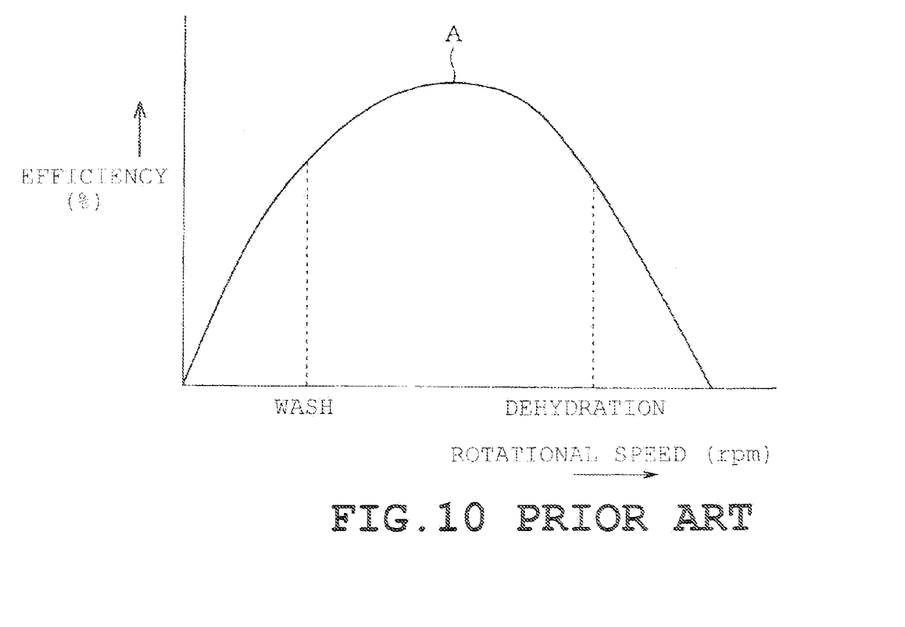
FIG. 10 is a graph showing the relationship between rotational speed and efficiency of a conventional motor.

The motor used in the above-described washing machine necessitates low-speed rotation and high torque in a washing operation including rinsing, whereas the motor necessitates high-speed rotation and low torque in a dehydrating operation including the intermediate dehydration and final dehydration, as shown in FIG. 9. In conventional motors, however, motor characteristics cannot be changed. Accordingly, a maximum efficiency point A of the motor is set between wash and dehydration as shown in FIG. 10. This results in a problem that the motor cannot efficiently be operated at each operation step.

In order that the above-described problem may be coped with, there is disclosed a technique of switching motor characteristics.

Although the motor characteristics can be switched so as to be suitable for the operation in each step in the aforementioned technique, the switch (the relay) is necessitated to switch between the Y-connection and the delta connection. The motor has a defect that the arrangement thereof is complicated.

SUMMARY

An object of the disclosure is to provide a washing machine in which motor characteristics can be switched so as to be suitable for the operation of each step, by a simpler arrangement.

Means for Overcoming the Problem

To achieve the foregoing and other objects, there is provided a washing machine which includes a water tub and an electric motor configured to rotate a load housed in the water tub and configured to execute a washing operation including a wash step, a rinse step, and a dehydration step. The motor comprises a stator including a stator coil, a rotor magnet arranged circumferentially with respect to the rotor, and a control device. The rotor magnet includes a permanent magnet. The control device is configured to control energizing of the stator coil to change a magnetic flux of the rotor magnet. When the control device applies a first voltage to the stator coil in the wash step of the washing operation, the rotor magnet is magnetized so that a magnetic flux of the rotor magnet acting on the stator is increased without reversal of a direction of magnetization. When the control device applies a second voltage to the stator soil in the dehydration step of the washing operation, the rotor magnet is magnetized so that a magnetic flux of the rotor magnet acting on the stator is reduced without reversal of a direction of magnetization as compared with the magnetic flux in the wash step.

DETAILED DESCRIPTION

First Embodiment

A first embodiment which is applied to a drum washing machine will be described with reference to FIGS. 1A to 6.

Figure 1A:
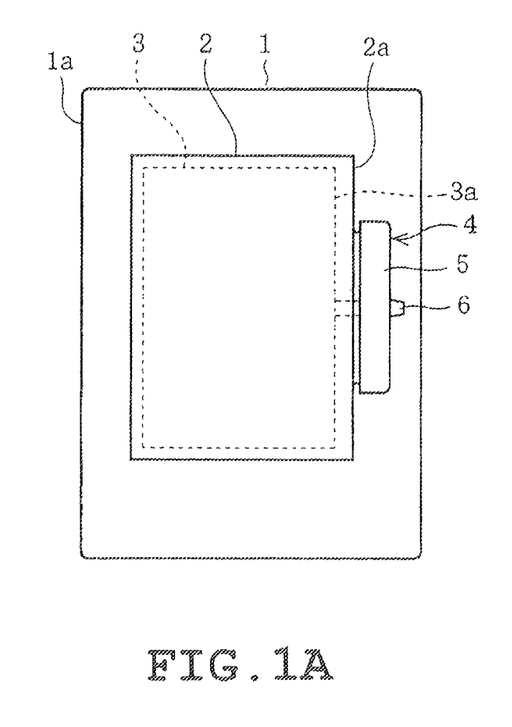
FIGS. 1A and 1B are a schematic longitudinal side section and a schematic longitudinal rear section of the washing machine in accordance with a first embodiment, each showing an outline construction of the washing machine, respectively.
Figure 1B:
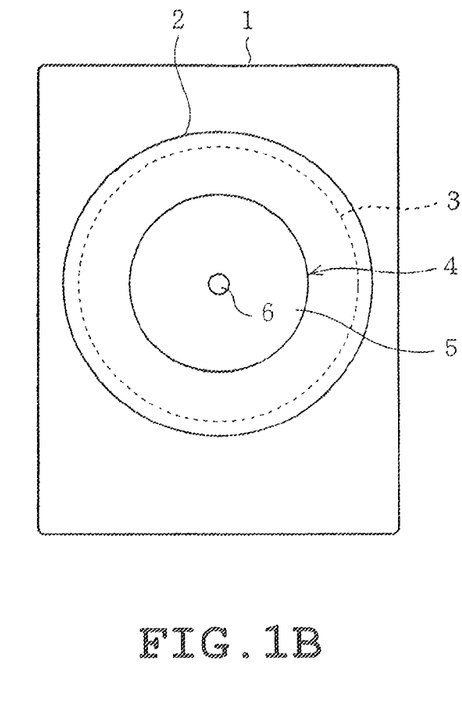

Referring to FIGS. 1A and 1B, firstly, the washing machine is provided with a water tub 2 in an outer casing 1. The water tub 2 is formed into a substantially cylindrical shape and has a closed rear 2a serving as an end (a right end surface as viewed in FIG. 1A). The water tub 2 is elastically supported by a damper mechanism (not shown) with an axis thereof being retained in a substantially horizontal state relative to the ground. A drum 3 constituting a rotating tub is rotatably accommodated in the water tub 2. The drum 3 is also formed into a substantially cylindrical shape and also has a closed rear surface 3a serving as an end (a right end surface as viewed in FIG. 1A). The drum 3 is accommodated in the water tub 2 with an axis thereof being retained in a substantially horizontal state relative to the ground. The drum 3 has a circumferential wall formed with a number of apertures (not shown). The outer casing 1 has a door (not shown) which is mounted on a front 1a thereof so as to close or open an access opening. The water tub 2 and the drum 3 have respective fronts which are open, whereby laundry is put into and taken out of the drum 3 through the access openings.

The washing machine is provided with an electric motor 4 which is mounted on the outer surface of the rear 2a of the water tub 2 and rotates the drum 3. The motor 4 is a brushless DC motor of the outer rotor type in the first embodiment. The motor 4 includes a rotor 5 to which a shaft 6 is connected. The shaft 6 is further connected to the rear of the drum 3. As a result, the washing machine is constructed into a direct drive system in which the drum 3 is directly driven by the electric motor 3. The drum 3 serves as a load that is rotated by the motor 4.

Figure 2:
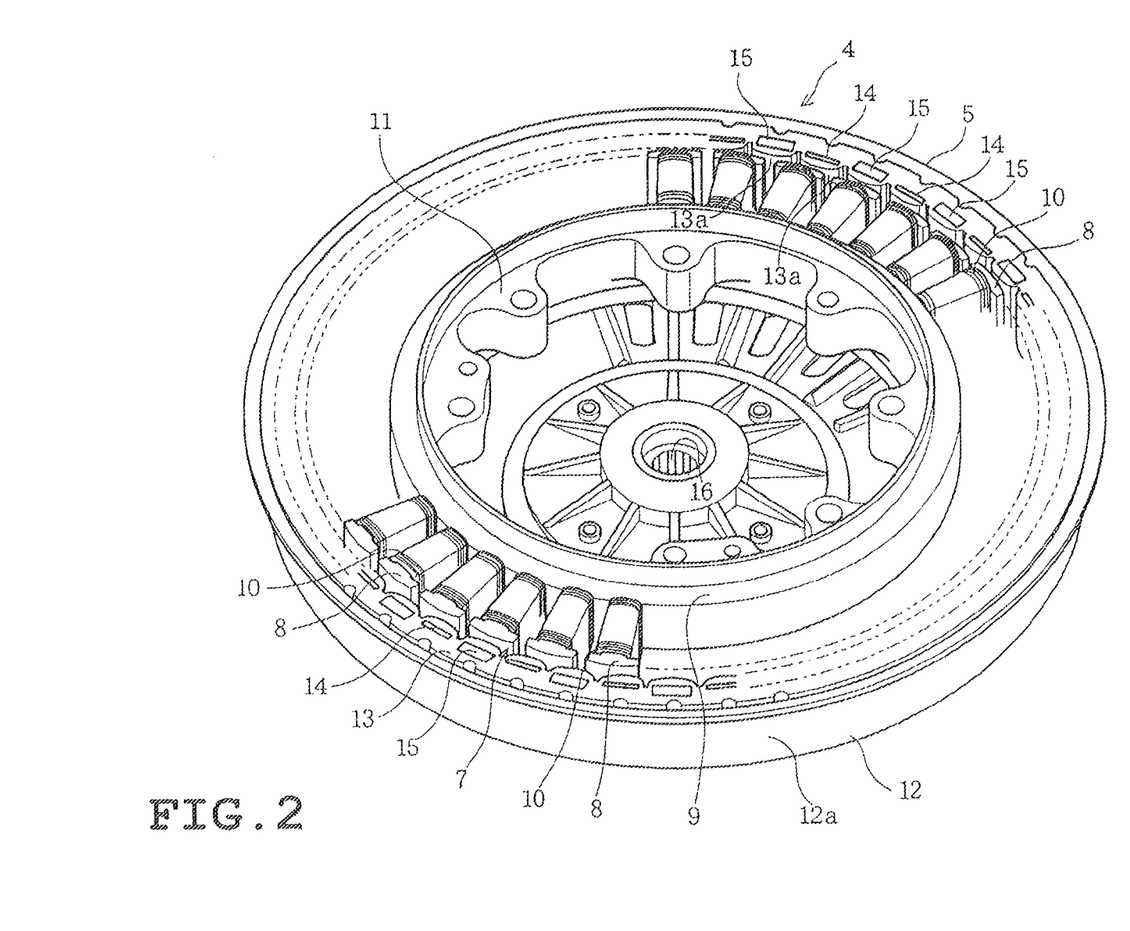
FIG. 2 is a perspective view of an electric motor.
Figure 3:
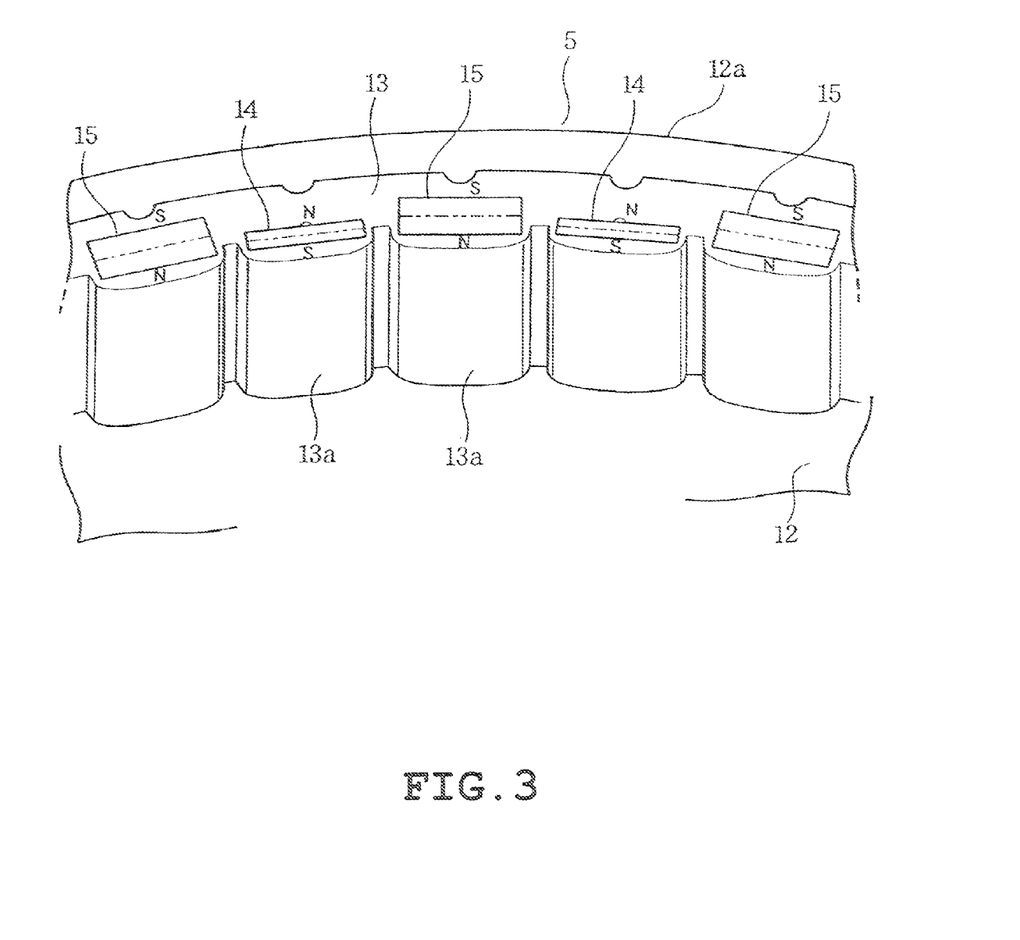
FIG. 3 is a partial perspective view of a rotor.

The motor 4 will now be described with reference to FIGS. 2 and 3. The motor 4 comprises a stator 7 further comprising a stator core 9 having a number of teeth 8 formed on an outer circumference, stator coils 10 wound on the respective teeth 8 and mounts 11 made of a synthetic resin. The stator 7 is fixed via the mounts 11 to the rear 2a of the water tub 2. For example, thirty-six teeth 8 are provided in the embodiment.

The rotor 5 comprises a frame 12 made of a magnetic material, a rotor core 13, first magnets 14 and second magnets 15. The frame 12 is formed into a shallow container and has an annular wall 12a on an outer circumference thereof. The rotor core 13 is formed into an annular shape and disposed on an inner circumference of the annular wall 12a. The first and second magnets 14 and 15 are inserted in a number of magnet insertion holes formed in the rotor core 13 respectively. The shaft 6 is connected to a shaft mount 16 provided in a central part of the frame 12.

Figure 4:
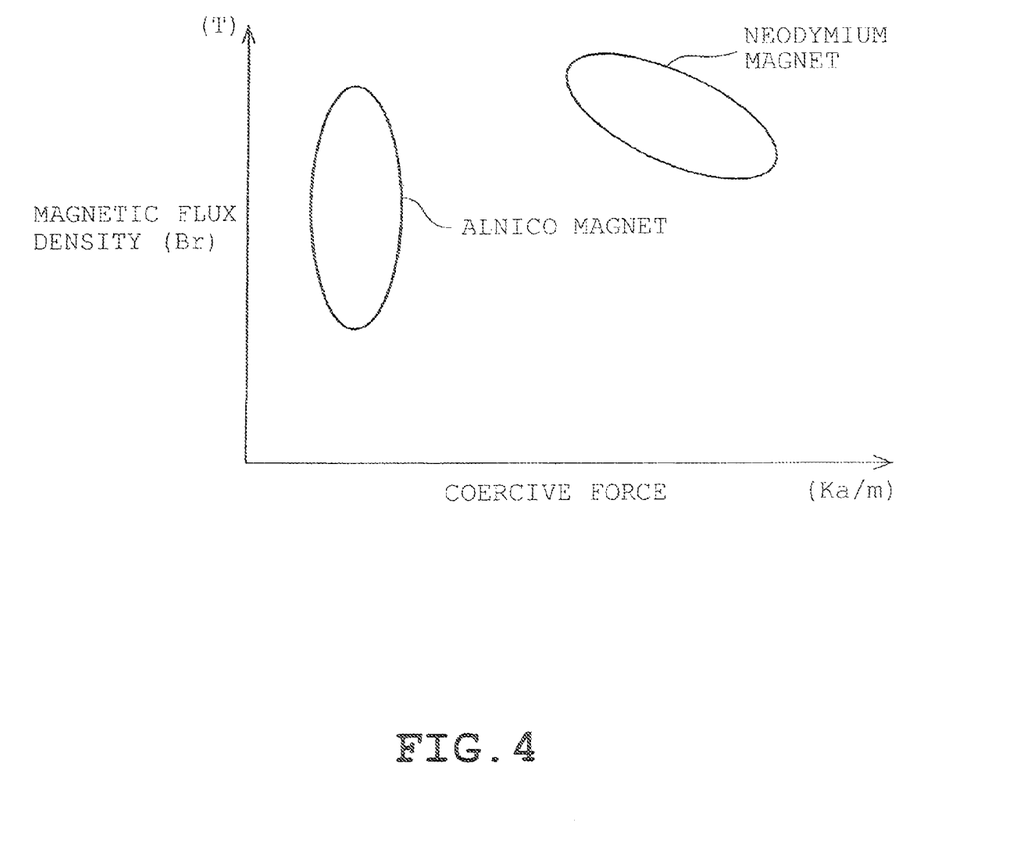
FIG. 4 is a graph showing the characteristics of a neodymium magnet and a alnico magnet.

The first and second magnets 14 and 15 each of which comprises a permanent magnet constitute a rotor magnet. Each first magnet 14 comprises a neodymium magnet having a higher coercive force. In this case, the neodymium magnet constituting each first magnet 14 has a coercive force of not less than 700 kA/m. On the other hand, each second magnet 15 comprises an alnico magnet having a lower coercive force than each first magnet 14. In this case, the alnico magnet constituting each second magnet 15 has a coercive force of not more than 350 kA/m. FIG. 4 shows characteristics of coercive forces and magnetic fluxes of the neodymium and alnico magnets. The first and second magnets 14 and 15 have polarities different from each other and are arranged circumferentially alternately. In the first embodiment, twenty-four first magnets 14 and twenty-four second magnets 15 and in total, forty-eight magnets are arranged. Each second magnet 15 has a larger thickness than each first magnet 14. Each first magnet 14 and each second magnet 15 are magnetized so that the polarities differ from each other in the radial direction, as shown in FIG. 3. The rotor core 13 has an inner circumference which is opposed to the stator 7 and has a number of protrusions 13a. The protrusions 13a are formed into arc shapes according to the first and second magnets 14 and 15 respectively.

The above-described motor 4 is controlled via an inverter circuit by a control device (not shown) including a microcomputer. The control device executes a control of washing operation by the washing machine.

Figure 5:
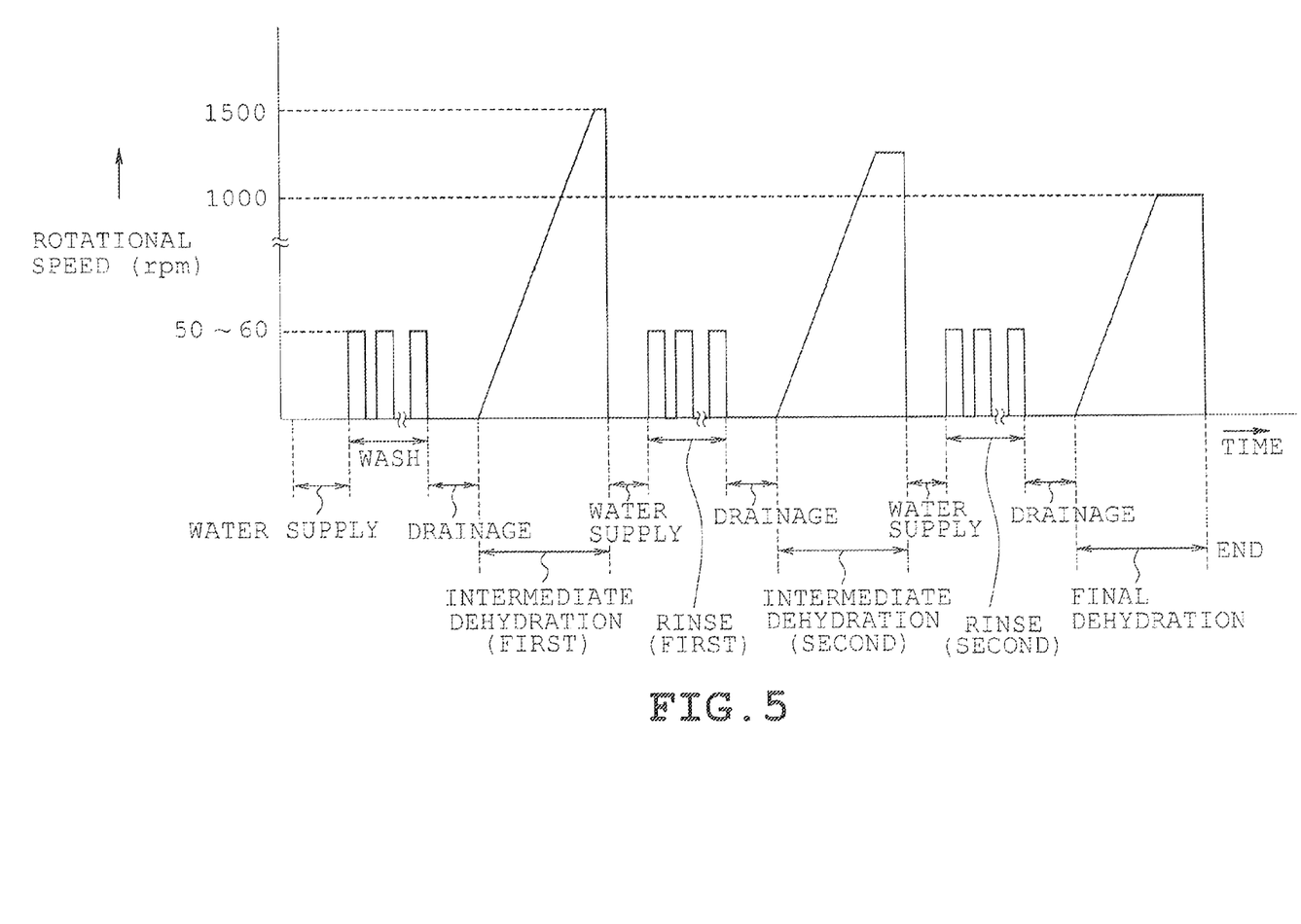
FIG. 5 is a graph showing the relationship between steps of washing operation and a rotational speed of a drum.

The washing machine constructed as described above will work as follows. FIG. 5 shows an example of the relationship between each step of a washing operation and a rotational speed of the drum. Upon start of the washing operation, the control device executes a water supply step. The control device opens a water-supply valve (not shown) in the water supply step so that water is supplied into the water tub 2 and that is, the drum 3. The water supplied into the water tub 2 is stored therein. The control device subsequently executes a wash step. The control device drives the motor 4 in the wash step so that the drum 3 is rotated by the motor 4 after detergent has been put into the water tub 2. In this case, the motor 4 is driven to rotate the drum 3 alternately in a normal direction and a reverse direction at a low rotational speed ranging from 50 rpm to 60 rpm, for example. As a result, laundry put into the drum 3 is washed. The control device executes a drain step after the wash step has been executed for a predetermined period of time. The control device opens a drain valve (not shown) connected to a drain outlet of the water tub 2 in the wash step while the drum 3 is stopped. As a result, the water stored in the water tub 2 and the drum 3 is discharged out of the washing machine.

The control device subsequently executes a first intermediate dehydration step. The control device drives the motor 4 in the first intermediate dehydration step so that the drum 3 is rotated at a high speed, for example, 1500 rpm in one direction. As a result, the laundry in the drum 3 is centrifugally dehydrated. The water extracted from the laundry is discharged through the drain outlet out of the washing machine.

Upon end of the first intermediate dehydration, the control device re-executes the water supply step while the drum 3 is stopped. As a result, water is supplied into the water tub 2 and the drum 3 to be stored therein. Subsequently, the control device executes a first rinse step. No detergent is used in the first rinse step. The control device executes the same control manner in the rinse step as in the wash step except for nonuse of detergent. More specifically, the control device drives the motor 4 so that the drum 3 is rotated alternately in the normal and reverse directions at low a rotational speed ranging from 50 rpm to 60 rpm, for example. As a result, the laundry put into the drum 3 is rinsed. The control device then executes a drain step in the same manner as described above after the first rinse step has been carried out for a predetermined time.

The control device then executes a second intermediate dehydration step. The control device executes the same control manner in the second intermediate dehydration step as in the first intermediate dehydration step. Upon end of the second intermediate dehydration step, the control device re-executes the water-supply step while the drum 3 is stopped. As a result, water is supplied into the water tub 2 and the drum 3 to be stored in the water tub 2. The control device then executes a second rinse step. The control device executes the same control manner in the second rinse step as in the first rinse step. After having executed the second rinse step for a predetermined period of time, the control device executes the drain step in the same manner as described above.

The control device then executes a final dehydration step. The control device drives the motor 4 in the final dehydration step so that the drum 3 is rotated at a high speed of, for example, 1000 rpm in one direction. As a result, the laundry accommodated in the drum 3 is centrifugally dehydrated, whereby the washing operation is completed.

In the case of the above-described wash step, the rotational speed of the drum 3 and accordingly the rotational speed of the motor 4 are set to low speeds ranging from 50 rpm to 60 rpm. Accordingly, the motor 4 necessitates a low-speed rotation and high-torque operation. The control device executes magnetization of the second magnets 15 constituting the rotor magnet of the motor 4 in the water supply step prior to the wash step, so that the magnetic flux is increased.

Figure 6:
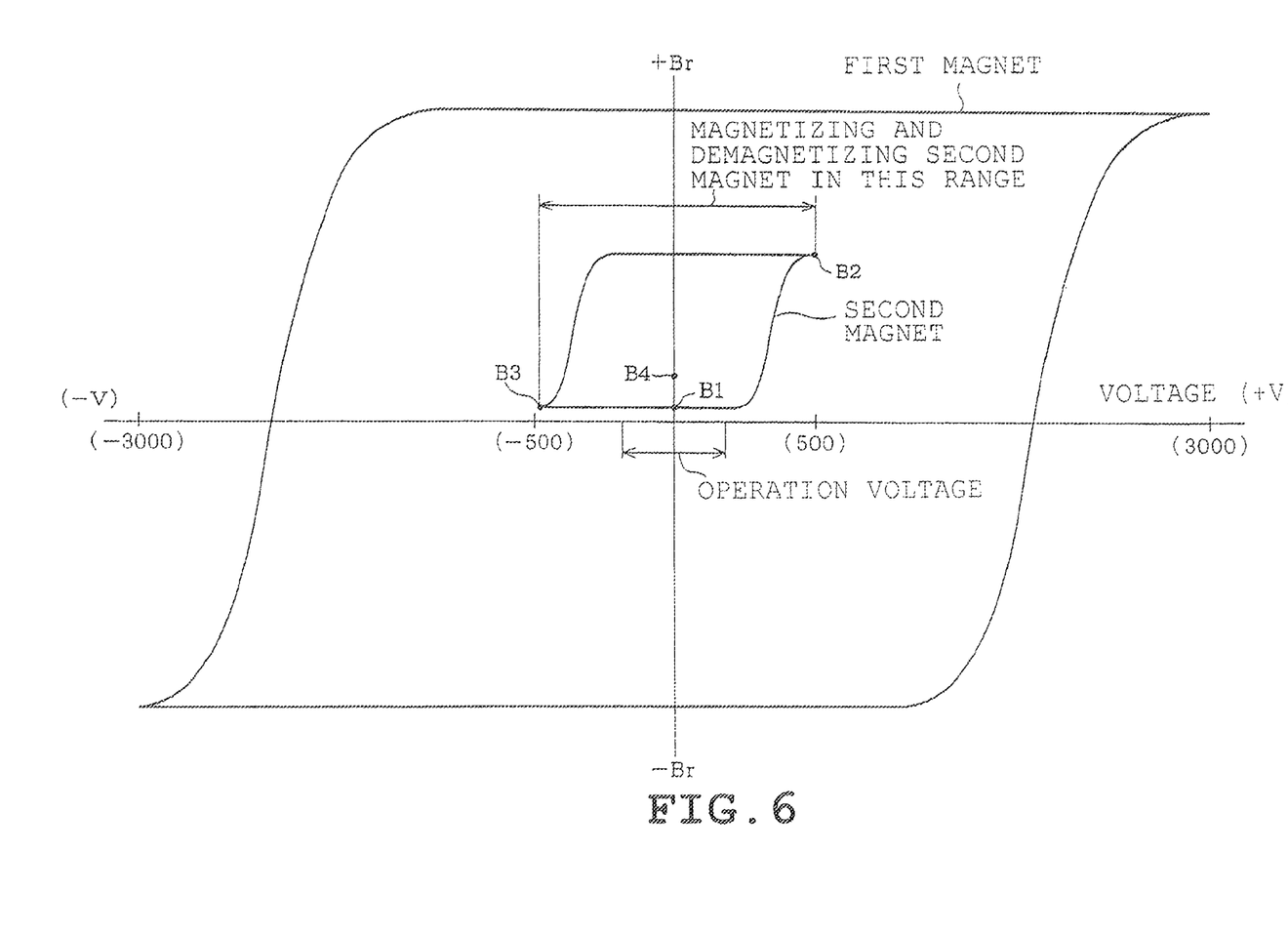
FIG. 6 is a graph showing a voltage-magnetic flux characteristic of a first magnet and operations of magnetization and demagnetization of the second magnet.

FIG. 6 shows voltage-flux characteristics of the first high-coercive force magnets 14 and magnetization and demagnetization of the second low-coercive force magnets 15. A magnetizing voltage in the magnetization of the first magnets 14 is set to about ±3000 V, and a magnetizing voltage in the magnetization of the second magnets 15 is set to about ±500 V. Point B1 is now assumed to designate the magnetic flux of the second magnets 15 indicative of a demagnetized state in the case where a washing operation starts. When the second magnets 15 are to be magnetized in this state, the control device controls energization of the stator coils 10 while the rotor 5 is held at a predetermined position, thereby magnetizing the second magnets 15.

More specifically, the control device applies, for example, voltage of +500 V to the stator coils 10. As a result, the magnetic flux of the second magnets 15 is increased to the maximum as shown by point B2 in FIG. 6. In this case, the current magnetic flux is maintained even when the second magnets 15 are released from voltage application. Consequently, the magnetic flux of the whole rotor magnet acting on the stator 7 is increased. The motor 4 develops high torque when the wash step is executed with the drum 3 being rotated at a low speed by the motor 4 in the aforementioned flux-increased state. In the wash step, a normal operating voltage of the stator coil 10 ranges between about ±200 V. Accordingly, the magnetic flux remains unchanged even when the second magnets 15 have a low coercive force.

On the other hand, the rotational speed of the drum 3 or the motor 4 is increased to 1500 rpm in the first intermediate dehydration step. In this case, the motor 4 necessitates high-speed rotation and low-torque operation. Accordingly, the control device demagnetizes the second magnets 15 in the rotor magnet of the motor 4 in the drain step prior to the first intermediate dehydration step, thereby decreasing the magnetic flux of the second magnets 15.

More specifically, the control device applies a voltage slightly higher than −500 V to the stator coils 10. As a result, the magnetic flux of the second magnets 15 is decreased nearly to zero. In this case, the current magnetic flux is maintained even when the second magnets 15 are released from voltage application. Consequently, the magnetic flux of the whole rotor magnet acting on the stator 7 is decreased. The operation of the motor 4 is rendered suitable for low-torque and high-speed rotation when the intermediate dehydration step is executed with the drum 3 being rotated at a high speed by the motor 4 in the aforementioned flux-decreased state. A normal operating voltage of the stator coils 10 ranges between about ±200 V in the intermediate dehydration step. Accordingly, the magnetic flux remains unchanged even when the second magnets 15 have a low coercive force.

The rotational speed of the drum 3 or the motor 4 is reduced to 50 rpm to 60 rpm in the first rinse step as in the wash step. In this case, the motor 4 necessitates low-speed rotation and high-torque operation. Accordingly, the control device magnetizes the second magnets 15 in the rotor magnet of the motor 4 in the water supply step prior to the first rinse step in the same manner as described above, thereby increasing the magnetic flux of the second magnets 15. The control device executes the first rinse step with the second magnets 15 having been magnetized.

The rotational speed of the drum 3 or the motor 4 is also increased to 1500 rpm in the second intermediate dehydration step as in the first intermediate dehydration step. In this case, the motor 4 necessitates high-speed rotation and low-torque operation. Accordingly, the control device demagnetizes the second magnets 15 in the rotor magnet of the motor 4 in the same manner as described above, thereby decreasing the magnetic flux of the second magnets 15. The control device executes the second intermediate dehydration step with the second magnets 15 having been demagnetized.

The rotational speed of the drum 3 or the motor 4 is reduced to 50 rpm to 60 rpm in the second rinse step as in the wash step and the first rinse step. In this case, the motor 4 necessitates low-speed rotation and high-torque operation. Accordingly, the control device magnetizes the second magnets 15 in the rotor magnet of the motor 4 in the water-supply step prior to the second rinse step in the same manner as described above, thereby increasing the magnetic flux of the second magnets 15. The control device executes the second rinse step with the second magnets 15 having been magnetized.

The rotational speed of the drum 3 or the motor 4 is increased to about 100 rpm in the final dehydration step. In this case, the motor 4 necessitates high-speed rotation and low-torque operation. Accordingly, the control device demagnetizes the second magnets 15 in the rotor magnet of the motor 4 in the drain step prior to the final dehydration step in the same manner as described above, thereby decreasing the magnetic flux of the second magnets 15. The control device executes the final dehydration step with the second magnets having been demagnetized.

The following effect can, be achieved from the first embodiment as described above. The rotor magnet of the rotor 5 includes the first high-coercive-force magnets 14 each having the high coercive field strength and the second low-coercive-force magnets 15 each of which has the low coercive field strength and the magnetic flux easy to change. The second magnets 15 are magnetized in each of the wash and rinse steps so that the magnetic flux of the rotor magnet acting on stator 7 is increased. The second magnets 15 are magnetized in each of the dehydration steps including the intermediate and final dehydration steps so that the magnetic flux of the rotor magnet is decreased as compared with that in each of the wash and rinse steps. As a result, the magnetic flux of the rotor magnet acting on the stator 7 is increased in each of the wash and rinse steps, whereupon the motor 4 driving the drum 3 marks the characteristics of low-speed rotation and high torque operation, which characteristics are suitable for the wash and rinse steps. On the other hand, in the dehydration step, the magnetic flux of the rotor magnet 7 is decreased as compared with each of the wash and rinse steps, whereby the motor 4 driving the drum 3 as the load marks the characteristics of high-speed rotation and low torque operation, which characteristics are suitable for the dehydration step. In this case, the characteristics of the motor 4 are controlled by changing the magnetic flux of the second magnets which constitute the rotor magnet and each have the lower coercive force. As a result, this control manner necessitates no switch such as a switching relay, differing from the control manner of switching an electrical connection mode of the stator coils. Accordingly, the characteristics of the motor 4 can be switched by a simple arrangement so as to be suitable for the operation in each step.

In the first embodiment, the first high-coercive force magnets 14 and the second low-coercive force magnets 15 form magnetic poles differing from each other, and the first and second magnets 14 and 15 are arranged circumferentially alternately. Consequently, although the magnetic flux of the rotor magnet is switchable, the arrangement for changing the magnetic flux can be prevented from being rendered complex.

In the first embodiment, the magnetic flux of the second magnets 15 is increased in the water-supply step of the washing operation, whereby the magnetization is executed. The magnetic flux of the second magnets 15 is decreased in the drain step of the washing operation, whereby the demagnetization is executed. The drum 3 serving as the load is not substantially driven by the motor 4 in each of the water-supply and drain steps. Accordingly, the position of the rotor is stabilized, and each of the magnetization and demagnetization can be executed in a stable state of the rotor 5.

The voltage applied to the stator coils 10 is set to about ±500 V in the first embodiment when the magnetic flux of the second magnets 15 is changed. The aforementioned applied voltage is higher than a voltage of ±200 V applied to the motor 4 for the normal operation and lower than the magnetization voltage of ±3000 V in the case where the first magnets 14 are magnetized. Consequently, the magnetic flux of the first magnets 14 can stably be ensured even when the magnetic flux of the second magnets 15 is changed, and a change in the magnetic flux of the second magnets 15 can be reduced in the normal operation of the motor 4.

In the first embodiment, the rotational speed of the drum 3 in the final dehydration step is set to 1000 rpm, which value is lower that the rotational speed of 1500 rpm in the intermediate dehydration step. In the demagnetization prior to the final dehydration step, the magnetic flux is reduced nearly to zero as in the demagnetization prior to the intermediate dehydration step as shown as point B1 in FIG. 6. In the demagnetization prior to the final dehydration step, however, the magnetic flux may be controlled so as to mark, for example, point B4 indicative of a value slightly larger than point B1 according to the reduction in the rotational speed. In this case, the voltage applied to the stator coils 10 for demagnetization is set to about −400 V. The magnetic flux of the second magnets 15 or of the whole rotor magnet is controlled in three stages. Accordingly, the motor efficiency can further be improved.

Second Embodiment

Figure 7A:
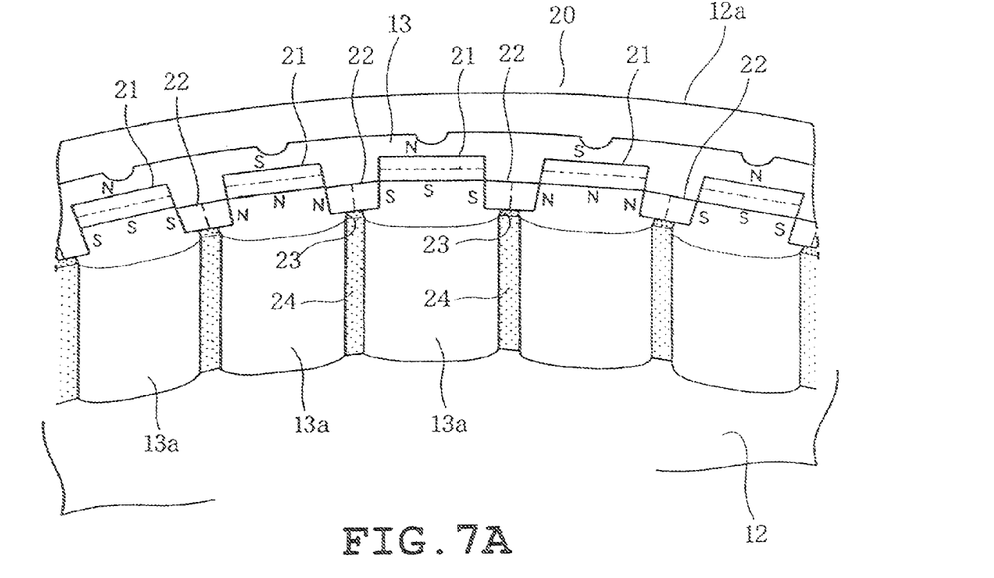
FIGS. 7A and 7B are partial perspective views of magnetized rotor magnet and demagnetized rotor magnet of a rotor in a second embodiment respectively.
Figure 7B:
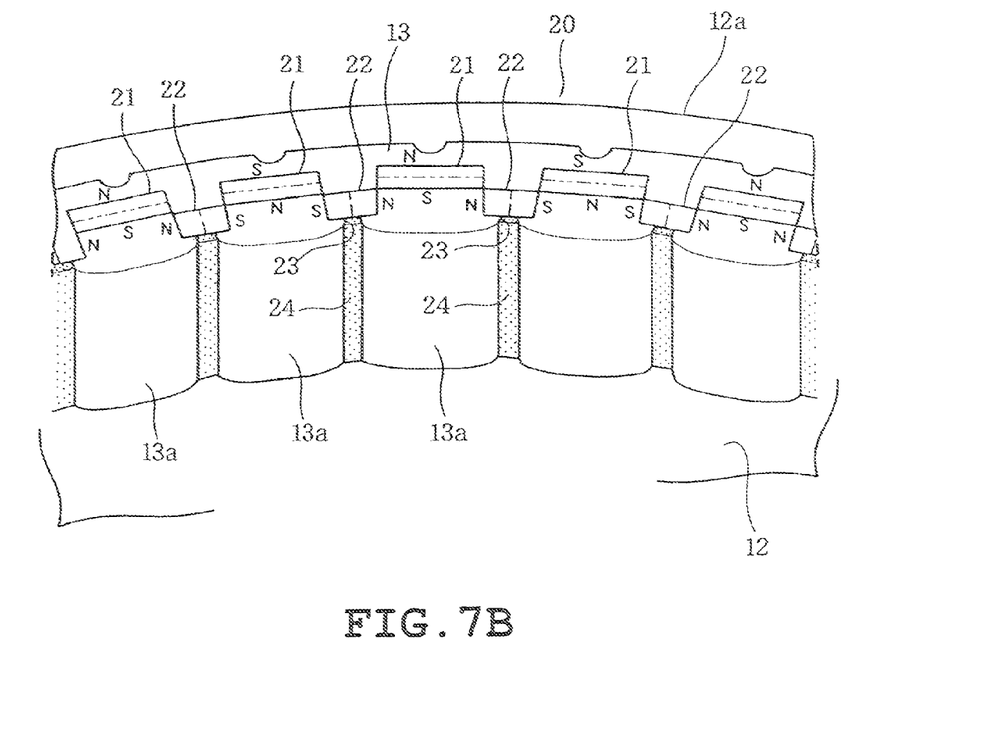
Figure 8:
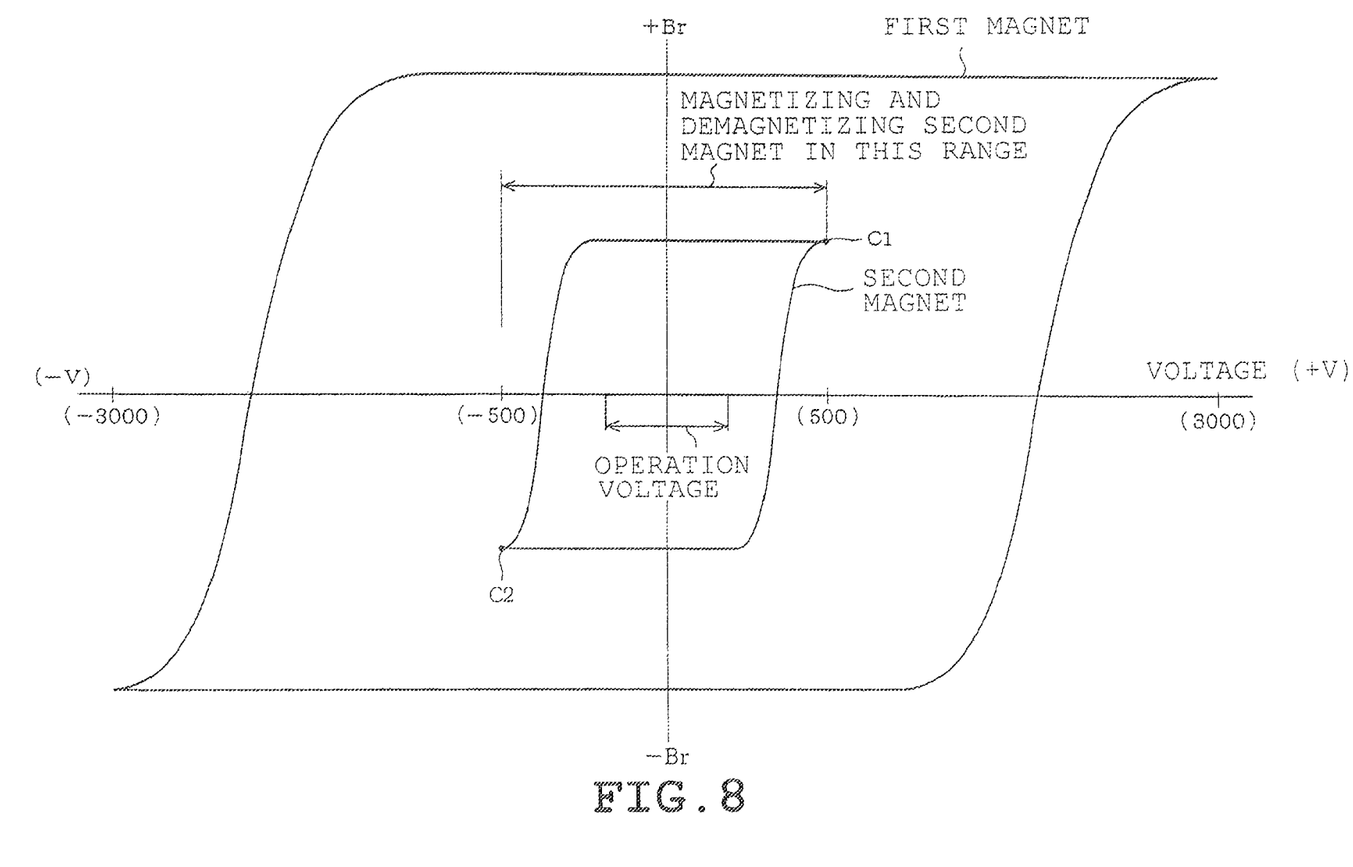
FIG. 8 is a view similar to FIG. 6.

FIGS. 7A to 8 illustrate a second embodiment. The second embodiment differs from the first embodiment in the following respects.

The rotor magnet constituting the rotor 20 includes first and second magnets 21 and 22 each of which comprises a permanent magnet as shown in FIGS. 7A and 7B. Each first magnet 21 comprises a neodymium magnet having a higher coercive force in the same manner as each first magnet 14 in the first embodiment. The neodymium magnet has a coercive force of not less than 700 kA/m. On the other hand, each second magnet 22 comprises an alnico magnet having a lower coercive force than each first magnet 21 in the same manner as each second magnet 15 in the first embodiment. The alnico magnet has a coercive force of not more than 350 kA/m.

The first magnets 21 are provided so as to correspond to protrusions 13a of the rotor core 13 respectively. In the embodiment, a number of, for example, forty-eight first magnets 21 are disposed in the circumferential direction. The first magnets 21 are magnetized so that the polarities differ from each other in the radial direction. The second magnets 22 are each located between two adjacent protrusions 13a so as to be nearer to the stator 7 side as shown in FIG. 2 than the first magnets 21. The second magnets 22 are magnetized so that the polarities differ from each other in the circumferential direction. In this case, each one first magnet 21 and two second magnets 22 located at right and left sides of each first magnet 21 respectively constitute one pole. The second magnets 22 are shared by the poles adjacent to each other. The rotor core 13 has openings 23 at the stator 7 side of the second magnets 23. The openings 23 are closed by a synthetic resin 24.

In the second embodiment configured as described above, the washing operation is executed in the same manner as shown in FIG. 5 in the first embodiment. In this case, the drum 3 is rotated at a low rotational speed ranging, for example, from 50 rpm to 60 rpm alternately in the normal and reverse directions by the motor 4 in each of the wash, first and second rinse steps. Accordingly, the motor 4 necessitates high torque. The control device then executes magnetization of the second magnets 22 in the rotor magnet of the motor 4 in the water supply step prior to the wash step, the water supply step prior to the first rinse step and the water supply step prior to the second rinse step, thereby increasing the magnetic flux of the second magnets 22.

In magnetizing the second magnets 22, the control device controls energization of the stator coil 10 so that, for example, a voltage of +500 V is applied to the stator coils 10 while the rotor 5 is retained at a predetermined position. As a result, the magnetic flux of the second magnets 22 is increased to the maximum as shown by point C1 in FIG. 8. In this case, each magnet 22 has a side which faces and has the same magnetic pole as the corresponding first magnet as shown in FIG. 7A. For example, when the protrusion 13a side of the first magnet 21 has a north pole, each of the second magnets 22 located on the right and left sides of the first magnet 21 has a north pole. The magnetic flux is retained even when each second magnet 22 is released from voltage application in this state. This increases the magnetic flux of the whole rotor magnet acting on the stator 7. The control device executes the wash, first and second rinse steps while rotating the drum 3 at the low speed by the motor 4 in this state. Consequently, the motor achieves the characteristics suitable for the low-speed rotation and high-torque operation. A normal operating voltage of the stator coils 10 ranges between about ±200 V in each of the wash, first and second rinse steps. Accordingly, the magnetic flux of the second magnet 22 is prevented from being changed even when the second magnets 22 have a low coercive force.

Furthermore, the drum 3 is rotated in one direction at a higher rotational speed of 1500 rpm or 1000 rpm in each of the first and second intermediate dehydration and final dehydration steps. Accordingly, the motor 4 necessitates high speed rotation and low torque operation. As a result, the control device demagnetizes the second magnets 15 in the rotor magnet of the motor 4 in the drain steps prior to the first and second intermediate dehydration steps and the final dehydration step respectively, thereby decreasing the magnetic flux of the second magnets 15.

In demagnetizing the second magnets 22, the control device controls energization of the stator coils 10 so that, for example, a voltage of −500 V is applied to the stator coil 10 while the rotor 5 is retained at a predetermined position. As a result, the magnetic flux of the second magnets 22 is increased to the maximum in the negative direction as shown by point C2 in FIG. 8. In this case, the magnetic pole is reversed between the north and south poles. More specifically, each magnet 22 has two sides which face and have the same magnetic poles as those of the corresponding first magnets 21 respectively as shown in FIG. 7B. For example, when the protrusion 13a side of the first magnet 21 has a north pole, each of the second magnets 22 located on the right and left sides of the first magnet 21 has a south pole. The magnetic flux is retained even when each second magnet 22 is released from voltage application in this state. As a result, the magnetic flux of the whole rotor magnet acting on the stator 7 is decreased. The control device executes the first, second and final intermediate dehydration steps while rotating the drum 3 at the high speed by the motor 4 in this state. Consequently, the motor achieves the characteristics suitable for the high-speed rotation and low-torque operation. A normal operating voltage of the stator coils 10 ranges between about ±200 V in each of the first, second and final intermediate dehydration steps. Accordingly, the magnetic flux of the second magnets 22 is prevented from being changed even when the second magnets 22 have a low coercive force.

The following effect can be achieved from the second embodiment as described above. The rotor magnet of the rotor 20 includes the first high-coercive-force magnets 21 each having the high coercive field strength and the second low-coercive-force magnets 22 each of which has the low coercive field strength and the magnetic flux easy to change. The second magnets 22 are magnetized in each of the wash and rinse steps so that the magnetic flux of the rotor magnet acting on the stator 7 is increased. The second magnets 22 are magnetized in each of the dehydration steps including the intermediate and final dehydration steps so that the magnetic flux of the rotor magnet is decreased as compared with that in each of the wash and rinse steps. As a result, the magnetic flux of the rotor magnet acting on the stator 7 is increased in each of the wash and rinse steps, whereupon the motor 4 driving the drum 3 marks the characteristics of low-speed rotation and high torque, which characteristics are suitable for the wash and rinse steps. On the other hand, in the dehydration step, the magnetic flux of the rotor magnet is decreased as compared with each of the wash and rinse steps, whereby the motor 4 driving the drum 3 as the load marks the characteristics of high-speed rotation and low torque, which characteristics are suitable for the dehydration step. In this case, the characteristics of the motor 4 are controlled by changing the magnetic flux of the second magnets 22 which constitute the rotor magnet and each have the lower coercive force. As a result, this control manner necessitates no switch such as a switching relay, differing from the control manner of switching an electrical connection mode of the stator coils. Accordingly, the characteristics of the motor 4 can be switched by a simple arrangement so as to be suitable for the operation in each step.

In the second embodiment, one first magnet 21 having a high coercive force and two second magnets 22 each having a low coercive force constitute one pole. Accordingly, the magnetic pole of each second magnet 22 can be reversed, whereupon an amount of magnetic flux can be increased and decreased to a large extent. With this, an amount of magnetic flux of the whole rotor magnet can be increased and decreased to a large extent, and the characteristics of the motor 4 can be rendered more suitable for each of the steps of the washing operation.

In the second embodiment, the magnetic flux of the second magnets 22 is increased in the water-supply step of the washing operation, whereby the magnetization is executed. The magnetic flux of the second magnets 22 is decreased in the drain step of the washing operation, whereby the demagnetization is executed. The drum 3 serving as the load is not substantially driven by the motor 4 in each of the water-supply and drain steps. Accordingly, the position of the rotor is stabilized, and magnetization and demagnetization can be executed in a stable state of the rotor 5.

In the second embodiment, the voltage applied to the stator coils 7 is set to about ±500 V when the magnetic flux of the second magnets 22 is changed. The aforementioned applied voltage is higher than a voltage of ±200 V applied to the motor 4 for the normal operation and lower than the magnetization voltage of ±3000 V in the case where the first magnets 21 are magnetized.

Consequently, the magnetic flux of the first magnets 21 can stably be ensured even when the magnetic flux of the second magnets 22 is changed, and a change in the magnetic flux of the second magnets 22 can be reduced in the normal operation of the motor 4.

In the second embodiment, the second magnets 22 with the magnetic flux increased or decreased are disposed so as to be located nearer to the stator 7 than the first magnets 21 is. Accordingly, the magnetic flux can easily be changed by the energization control of the stator coils 10.

In the second embodiment, too, the rotational speed of the drum 3 in the final dehydration step, is set to 1000 rpm, which value is lower than the rotational speed of 1500 rpm in the intermediate dehydration step. Accordingly, the magnetic flux may be controlled so as to be slightly larger than point C2 without reduction to point C2 in the demagnetization prior to the final dehydration step.

Other Embodiments

The disclosure should not be limited to the above-described embodiments but the embodiments may be modified or expanded as follows. The motor 4 should not be limited to the exemplified outer rotor type but may be of the inner rotor type, instead. The washing machine may be a washer-drier with a drying function. The washing machine should not be limited to the drum type washing machine but may be a vertical axis type washing machine having a rotating tub extending up and down in the direction of gravitational force. In the case of the vertical axis type washing machine, an electric motor rotates an agitator agitating laundry at a low speed in a normal direction or a reverse direction in each of wash and rinse steps. The motor rotates the agitator and the rotating tub together in one direction at a high speed in the dehydration step. In this case, a load driven by the motor is the agitator and the rotating tub.

The foregoing description and drawings are merely illustrative of the principles of the present disclosure and are not to be construed in a limiting sense. Various changes and modifications will become apparent to those of ordinary skill in the art. All such changes and modifications are seen to fall within the scope of the disclosure as defined by the appended claims.

The invention claimed is:

1. A washing machine which includes a water tub and an electric motor configured to rotate a load housed in the water tub and configured to execute a washing operation including a wash step, a rinse step, and a dehydration step, the motor comprising:
 a stator including a stator coil;
 a rotor including a rotor magnet arranged circumferentially with respect to the rotor, the rotor magnet including a permanent magnet; and
 a control device configured to control energizing of the stator coil to change a magnetic flux of the rotor magnet;
 wherein the control device is configured to apply a first voltage to the stator coil in the wash step of the washing operation to cause the rotor magnet to be magnetized so that a magnetic flux of the rotor magnet acting on the stator is increased without reversal of a direction of magnetization; and
 the control device is configured to apply a second voltage to the stator coil in the dehydration step of the washing operation to cause the rotor magnet to be magnetized so that the magnetic flux of the rotor magnet acting on the stator is reduced without reversal of a direction of magnetization as compared with the magnetic flux in the wash step.

2. The washing machine according to claim 1, wherein the magnetic flux of the rotor magnet is changed by controlling energization of the stator coil when the load is not substantially driven by the motor.

3. The washing machine according to claim 2, wherein the magnetic flux of the rotor magnet is increased by controlling energization of the stator coil in a water supply step in which water is supplied into the water tub.

4. The washing machine according to claim 3, wherein the magnetic flux of the rotor magnet is decreased by controlling energization of the stator coil in a drain step in which water is discharged from the water tub.

5. The washing machine according to claim 4, wherein the rotor magnet further includes a magnet having a higher coercive force than the permanent magnet, and the permanent magnet is disposed nearer to the stator than the magnet having the higher coercive force.

6. The washing machine according to claim 5, wherein a voltage, applied to the stator coil in a case where the magnetic flux of the rotor magnet is changed, is set higher than a voltage in a case where the motor is normally operated and lower than a magnetizing voltage in a case where the magnet having the higher coercive force is magnetized.

7. The washing machine according to claim 1, wherein the magnetic flux of the rotor magnet is increased by controlling energization of the stator coil in a water supply step in which water is supplied into the water tub.

8. The washing machine according to claim 1, wherein the magnetic flux of the rotor magnet is decreased by controlling energization of the stator coil in a drain step in which water is discharged from the water tub.

9. The washing machine according to claim 1, wherein the rotor magnet further includes a magnet having a higher coercive force than the permanent magnet, and the permanent magnet is disposed nearer to the stator than the magnet having the higher coercive force.

10. The washing machine according to claim 1, wherein the rotor magnet further includes a magnet having a higher coercive force than the permanent magnet, and a voltage, applied to the stator coil in a case where the magnetic flux of the rotor magnet is changed, is set higher than a voltage in a case where the motor is normally operated and lower than a magnetizing voltage in a case where the magnet having the higher coercive force is magnetized.

* * * * *